(12) United States Patent
Yeo et al.

(10) Patent No.: US 11,544,353 B2
(45) Date of Patent: **\*Jan. 3, 2023**

(54) OBLIVIOUS RAM WITH LOGARITHMIC OVERHEAD

(71) Applicant: Google LLC, Mountain View, CA (US)

(72) Inventors: Kevin Yeo, Mountain View, CA (US); Sarvar Patel, Montville, NJ (US); Giuseppe Persiano, New York, NY (US); Mariana Raykova, Mountain View, CA (US)

(73) Assignee: Google LLC, Mountain View, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/313,597

(22) Filed: May 6, 2021

(65) Prior Publication Data
US 2021/0279301 A1  Sep. 9, 2021

Related U.S. Application Data

(63) Continuation of application No. 16/365,224, filed on Mar. 26, 2019, now Pat. No. 11,023,168.

(Continued)

(51) Int. Cl.
*G06F 16/30* (2019.01)
*G06F 21/10* (2013.01)
(Continued)

(52) U.S. Cl.
CPC .............. *G06F 21/10* (2013.01); *G06F 3/064* (2013.01); *G06F 3/0604* (2013.01);
(Continued)

(58) Field of Classification Search
CPC ... G06F 16/2255; G06F 16/2462; G06F 16/10
(Continued)

(56) References Cited

U.S. PATENT DOCUMENTS 5,123,045 A   6/1992  Ostrovsky et al.
8,898,204 B1  11/2014 Sathe et al.
(Continued)

OTHER PUBLICATIONS

Dan Boneh, et al. : "Remote Oblivious Storage: Making Oblivious RAM Practical", Mar. 30, 2011 (Mar. 30, 2011), XPO55461454, Retrieved from the Internet: URL:https://dspace.mit.edu/bitstream/handle/1721.1/62006/MIT-CSAIL-TR-2011-018.pdf [retrieved on Mar. 21, 2011], 20 pages.

(Continued)

*Primary Examiner* — Sana A Al-Hashemi
(74) *Attorney, Agent, or Firm* — Homgman LLP; Brett A. Krueger

(57) ABSTRACT

A method includes executing an instruction to execute a query for a data block, the data block associated with a corresponding memory level of a logarithmic number of memory levels ($l_i$) of memory, each memory level ($l_i$) including physical memory ($RAM_i$) residing on memory hardware of a distributed system. The method also includes retrieving a value associated with the data block from an oblivious hash table using a corresponding key, and extracting un-queried key value pairs from the oblivious hash table associated with un-queried data blocks after executing a threshold number of queries for data blocks. The method also includes a multi-array shuffle routine on the extracted key value pairs from the oblivious hash table to generate an output array containing the un-queried key value pairs.

20 Claims, 13 Drawing Sheets

Related U.S. Application Data

(60) Provisional application No. 62/653,762, filed on Apr. 6, 2018.

(51) Int. Cl.
    *G06F 3/06*         (2006.01)
    *G06F 16/22*       (2019.01)
    *G06F 21/78*       (2013.01)
    *H04L 67/10*       (2022.01)

(52) U.S. Cl.
    CPC .......... *G06F 3/0644* (2013.01); *G06F 3/0659* (2013.01); *G06F 3/0673* (2013.01); *G06F 16/2255* (2019.01); *G06F 21/78* (2013.01); *H04L 67/10* (2013.01)

(58) Field of Classification Search
    USPC ........ 707/609, 687, 705, 769, 790, 813, 821
    See application file for complete search history.

(56) References Cited

U.S. PATENT DOCUMENTS

| | | | |
|---|---|---|---|
| 9,164,702 | B1 | 10/2015 | Nesbit et al. |
| 10,635,824 | B1 | 4/2020 | Triandopoulos et al. |
| 2001/0034839 | A1 | 10/2001 | Karjoth et al. |
| 2003/0076764 | A1* | 4/2003 | Iwano ................... G11B 27/329 707/999.2 |
| 2004/0054848 | A1* | 3/2004 | Folsom ................ G05B 19/045 711/108 |
| 2004/0107223 | A1* | 6/2004 | Uno ....................... G06F 16/10 |
| 2014/0007250 | A1 | 1/2014 | Stefanov et al. |
| 2019/0310799 | A1 | 10/2019 | Yeo et al. |
| 2020/0097587 | A1* | 3/2020 | Klein ................... G06F 16/2462 |

OTHER PUBLICATIONS

International Search Report, PCT/US2019/024102, dated May 22, 2019, 14 pages.

\* cited by examiner

Memory-Level Map 300

| Data Block | Query Memory Level ($I_q$) |
|---|---|
| $B_1$ | Level 1 ($RAM_1$) |
| $B_2$ | Level 4 ($RAM_4$) |
| $B_3$ | Level 3 ($RAM_3$) |
| $B_4$ | Level 2 ($RAM_2$) |
| ⋮ | |
| $B_N$ | Level 1 ($RAM_1$) |

FIG. 3

Construction 9. Let OblivHT = (OblivHT.Init, OblivHT.Build, OblivHT.Lookup, OblivHT.Extract) be an oblivious hash table and OblMultArrShuff an oblivious multi-array shuffle. Let $U = U_{real} \cup U_{dummy} \cup U_{query}$, where the items of the database come from $U_{real}$, items used for padding in the construction come from $U_{dummy}$ and dummy queries use values from $U_{query}$. We construct an oblivious RAM scheme ORAM = (ORAM.Init, ORAM.Access) as follows:

- $(\tilde{D}, \text{st}) \leftarrow \text{ORAM.Init}(1^\lambda, D)$:

1. Create a hierarchy of $\log N$ levels $\{\ell_i\}_{i=\alpha}^{\log N}$ of size $2^i$ where $N$ is the size of $D$ and $2^\alpha = O(\log N)$.
  2. Initialize an oblivious hash table that contains the whole database by running $$(\text{st}, \tilde{D}') \leftarrow \text{OblivHT.Init}(D)$$
  $$(\text{st}, \tilde{H}, \tilde{S}) \leftarrow \text{OblivHT.Build}(\tilde{D}', \text{st})$$

3. Set the first level to be the array representing the stash for the oblivious hash table $\ell_\alpha \leftarrow \tilde{S}$, last level to be the new oblivious hash table $\ell_{\log N} \leftarrow (\text{st}, \tilde{H})$ and and the first level all other levels to be empty $\{\ell_i \leftarrow \perp\}_{i=\alpha+1}^{\log N - 1}$.
  4. Set $\tilde{D} \leftarrow \{\ell_i\}_{i=\alpha}^{\log N}$. Output $(\tilde{D}, SK)$ where $SK \in \text{st}$.

- $(v, \text{st}) \leftarrow \text{ORAM.Access}(\text{st}, \tilde{D}, l, \text{cnt})$:

1. If $\text{cnt} = 2^j$ for some $j$, invoke ORAM.Shuffle($\{\ell_i, \text{st}\}_{i=\alpha}^j$) defined below.
  2. Parse $\tilde{D} \leftarrow \{\ell_i\}_{i=\alpha}^{\log N}$ where $\ell_i = (\text{st}_i, \tilde{H}_i)$ and $l = (\text{op}, \text{addr}, \text{data})$.
  3. Set flag found = 1.
  4. Do a linear scan on the items $(k_j, v_j)$ stored in the array stored in the smallest level $\ell_\alpha$ looking for item with $k = \text{addr}$. If such an item is found, set found = 1.
  5. For $i = \alpha + 1$ to $\log N$, do the following:
     (a) If found = 0, then sample a random query from $k \leftarrow U_{query}$. Otherwise, set $k \leftarrow \text{addr}$.
     (b) Do a lookup in the oblivious hash table at that level:

$$(v, \tilde{H}'_i, \perp, \text{st}'_i) \leftarrow \text{OblivHT.Lookup}(k, \tilde{H}_i, \perp, \text{st}_i).$$

(c) Update $\ell_i \leftarrow (\text{st}'_i, \tilde{H}'_i)$.
     (d) If op = read, the set $d = \text{Enc}(SK, (\text{addr}, v))$, else if op = write, set $d = \text{Enc}(SK, (\text{addr}, \text{data}))$. Append $d$ to the array stored in $\ell_\alpha$ where $SK \leftarrow \text{st}$.

- $\tilde{D} \leftarrow \text{ORAM.Shuffle}(\{\ell_i, \text{st}\}_{i=\alpha}^j)$:

1. Append to the smallest level $\ell_\alpha$, $2^\alpha + 1$ dummy items from $U_{dummy}$ and then apply an oblivious shuffle on the resulting set of real and dummy items and set $\tilde{A}_\alpha$ to be the output of the oblivious shuffle.
  2. For $i = \alpha + 1$ to $j$, parse $\ell_i = (\text{st}_i, \tilde{H}_i)$ $$(\tilde{A}_i, \text{st}'_i) \leftarrow \text{OblivHT.Extract}(\tilde{H}_i, \text{st}_i).$$

3. Run the multi-array shuffle algorithm on the data extracted from each level oblivious hash table $$\tilde{D} \leftarrow \text{OblMultArrShuff}\left(\{\tilde{A}_i\}_{i=\alpha}^j\right).$$

4. Construct an oblivious hash table using the output from the multi-array shuffle $$(\text{st}_j, \tilde{H}_j, \tilde{S}_j) \leftarrow \text{OblivHT.Build}(\tilde{D}, \text{st}).$$

5. Set $\ell_j \leftarrow (\text{st}_j, \tilde{H}_j)$, $\ell_\alpha \leftarrow \tilde{S}_j$ and all intermediate levels to be empty $\{\ell_i \leftarrow \perp\}_{i=\alpha+1}^{j-1}$.
  6. Return $\tilde{D} \leftarrow \{\ell_i\}_{i=\alpha}^{\log N}$.

Construction 5 (Oblivious Multi-Array Shuffle). We define an oblivious multi-array shuffle ObIMultArrShuff.

- $D \leftarrow \text{ObIMultArrShuff}(A_1, \ldots, A_L)$:
  1. Construct $D$ to be an array of $N$ empty block locations.
  2. Pick $L'$ maximally such that $A_{L'} \geq \frac{N}{\log N}$.
     Obliviously sort the arrays $A_1, \ldots, A_L$ into $A_{0,L'}$ according to a pseudorandomly generated permutation.
  3. Copy $A_1, \ldots, A_{L'-1}$ into $A_{0,1}, \ldots, A_{0,L'-1}$.
  4. Privately generate assignment function $\text{Assign}: [N] \to [L']$, such that for every $i \in [L']$, $|\{j \in [N] : \text{Assign}(j) = i\}| = |A_i|$ in the following way:

For $i = 1, \ldots, L'$, store an encryption of $cnt_i$ initialized as $cnt_i := A_{0,i}$.
     For $j = 1, \ldots, N$, set $\text{Assign}(j)$ equal to the minimal $k$ such that $cnt_1 + \ldots + cnt_k \geq r$, where $1 \leq r \leq N - (j-1)$ is randomly selected.
     The value $k$ is found by scanning the encrypted integers $cnt_1, \ldots, cnt_{L'}$.
     Once $k$ is found, $cnt_k$ is decremented.

Assign is stored in an encrypted array.
  5. Initialize EmptyOutputIndices$_0 = \{(j, \text{Assign}(j))\}_{j \in [N]}$ as the set of pairs consisting of the indices of $D$ that are still empty and the value $\text{Assign}(j)$ encrypted.
  6. Execute ObIMultArrShuff.Shuffle($A_{0,1}, \ldots, A_{0,L'}$, $D$, EmptyOutputIndices$_0$, $N$, 0).
  7. Return $D$.

- ObIMultArrShuff.Shuffle($A_{\ell,1}, \ldots, A_{\ell,L}$, $D$, EmptyOutputIndices$_\ell$, $\ell$):
  1. If $|A_{\ell,1} + \ldots + A_{\ell,L}| \leq \frac{N}{\log N}$ then
     Place the remaining blocks of $A_{\ell,1}, \ldots, A_{\ell,L}$ into $D[\text{EmptyOutputIndices}_\ell]$ by invoking ObIMultArrShuff.BinShuffle($\ldots, A_{\ell,L}$, EmptyOutputIndices$_\ell$, $D$, $\ell$).
     Stop.
  2. Set NumOutBins $:= (2\epsilon)^\ell \frac{N}{\log N}$ and NumInBins $:= (1 - 2\epsilon) \cdot$ NumOutBins.
  3. Initialize InBin$_1, \ldots,$ InBin$_{\text{NumInBins}}$ as empty arrays of blocks and assign each block from $A_{\ell,1}, \ldots, A_{\ell,L}$ to a randomly selected InBin.
  4. Initialize OutBin$_1, \ldots,$ OutBin$_{\text{NumOutBins}}$ as empty integer arrays and assign each each pair from EmptyOutputIndices$_\ell$ to a randomly selected OutBin$_j$.
  5. Initialize $A_{\ell+1,1}, \ldots, A_{\ell+1,L}$ as empty block arrays.
  6. For $i = 1, \ldots,$ NumInBins:
     (a) Execute (LeftoverBin$_1, \ldots,$ LeftoverBin$_L$) $\leftarrow$ ObIMultArrShuff.BinShuffle(InBin$_i$, OutBin$_i$, $D$, $\ell$).
     (b) Append LeftoverBin$_j$ to $A_{\ell+1,j}$ for $j = 1, \ldots, L$.
  7. Set EmptyOutputIndices$_{\ell+1} :=$ OutBin$_{\text{NumInBins}+1} \cup \ldots \cup$ OutBin$_{\text{NumOutBins}}$.
  8. Execute ObIMultArrShuff.Shuffle(Assign, $A_{\ell+1,1}, \ldots, A_{\ell+1,L}$, $D$, EmptyOutputIndices$_{\ell+1}$, $\ell+1$).

FIG. 5A

- $(LeftoverBin_1, \ldots, LeftoverBin_L) \leftarrow \text{OblMultArrShuff.BinShuffle}(InBin, OutBin, D, \ell)$ 1. For $i = 1, \ldots, L$, create $NumLeftover_i := (4\epsilon)^{\ell+1}(2\alpha)^{\ell}|A_{0,i}| \cdot \frac{\log \lambda}{\log \Delta}$ dummy blocks tagged with array index $i$ and add them to $InBin$.
  2. Obliviously sort $InBin$ according to array index and placing real blocks before dummy blocks with the same array index.

As a result of the sort, all real blocks with array index $i$ will appear consecutively, followed directly by all dummy blocks with array index $i$.
  3. Scan $OutBin$ and privately compute $cnt_i$, the number of blocks from $A_{\ell,i}$ that must be placed into $D[OutBin]$, for $i = 1, \ldots, L$.

To do this obliviously, the client will iterate through each pair of $OutBin$ to determine which of $cnt_1, \ldots, cnt_L$ to increment. To obliviously increment, the client scans each of $cnt_1, \ldots, cnt_L$ and only increments the relevant counter.
  4. For each array $A_{\ell,i}$, privately mark the blocks with array index $i$ in the following way:

The first $cnt_i$ blocks with array index $i$ are marked as moving. The next $NumLeftover_i$ are marked as leftover. The remaining are marked as unused.

The algorithm aborts if a dummy block is marked moving or a real block is marked unused.

To perform this obliviously, the client will scan the blocks of $InBin$. For each block, the client will also scan $cnt_1, \ldots, cnt_L$ to have the necessary information to perform the marking. In particular, when a block with array index $i$ is encountered, if $cnt_i > 0$, then the block is marked as real and $cnt_i$ is decremented. If $-NumLeftover_i < cnt_i \leq 0$, then the block is marked as leftover and $cnt_i$ is decremented. Finally, if $cnt_i \leq -NumLeftover_i$, then the block is marked as unused.
  5. Obliviously sort $InBin$ according to the type of block with moving blocks before leftover blocks and leftover blocks before unused blocks and use array index as a tiebreaker.

As a result of the sort, all blocks marked as moving with array index $i$ appear consecutively. Similarly, all blocks marked as leftover with array index appear consecutively.
  6. The blocks of $InBin$ are distributed as follows:

The first $|OutBin|$ blocks are placed into $TempD$ and the next $NumLeftover_i$ blocks are placed into $LeftoverBin_i$ in increasing order of $i = 1, \ldots, L$.
  7. Obliviously sort the pairs in $OutBin$ according to array index.

As a result of the sort, for any $i = 1, \ldots, L$, all locations $j$ such that $Assign(j) = i$ appear consecutively. Furthermore, if a pair $(j, Assign(j))$ appears in the $k$-th location of $OutBin$, then the $k$-th location of $TempD$ also contains a block with array index $Assign(j)$.
  8. Simultaneously scan $OutBin$ and $TempD$. Tag the block at the $k$-th location of $TempD$ with the index of $D$ found in the pair at the $k$-th location of $OutBin$.
  9. Obliviously sort $TempD$ according to the new tag and place the blocks into $D[OutBin]$ in increasing order of index.

Construction 6 (Oblivious Bin Tree). Let F be a pseudorandom function and (Gen, Enc, Dec) be a symmetric key encryption. Let $U = U_{real} \cup U_{dummy}$ where $U_{real}$ and $U_{dummy}$ are two non-intersecting sets representing the real and dummy key identifiers. We define an oblivious hash construction OblivBin = (OblivBinTree.Init, OblivBinTree.Build, OblivBinTree.Lookup, OblivBinTree.Extract) as follows:

- $(st, \tilde{D}) \leftarrow$ OblivBinTree.Init$(D = \{k_i, v_i\}_{i=1}^{N})$:

1. Generate $N$ dummy items $(k'_i, \perp)_{i=N+1}^{2N}$ where $k'_i \in U_{dummy}$ and append them to $D$.
  2. Generate an encryption key SK and set st ← SK.
  3. Set $\tilde{D} = \{ct_i = \text{Enc}(SK, (b_i, k_i, v_i))\}_{i=1}^{2N}$ where $b_i = 0$ if $k_i$ is real and $b_i = 1$ if $k_i$ is dummy. The real and dummy items are in any, not necessarily random, order.

- $(st, \tilde{H}_{tree}) \leftarrow$ OblivBinTree.Build$(D = \{(b_i, k_i, v_i)\}_{i=1}^{2N})$:

1. Generate a PRF key K and encryption key SK ← Gen$(1^\lambda)$, and set st ← (K, SK).
  2. Use an oblivious sort to sort the $2N$ items according to their tags $F(K, k_i)$.
  3. Set $\tilde{H}_{tree}$ to be a binary search tree on top of the sorted array from the previous step.
  4. In this oblivious structure the additional array $\tilde{S} \leftarrow \perp$ is not used.

- $(v, \tilde{H}_{tree}') \leftarrow$ OblivBinTree.Lookup$(i, \tilde{H}_{tree}, st)$:

1. Compute $d_i = F(K, i)$ and run a binary tree search to retrieve the node on a path of $\tilde{H}_{tree}$.
  2. Decrypt using SK the leaf node on the retrieved path to obtain $(b_j, j, v_j)$. If $i = j$, set $v \leftarrow v_j$ and write back a ciphertext in the leaf node Enc(SK, $(2, j, v_j)$). Otherwise, set $v \leftarrow \perp$ and write back Enc(SK, $(b_j, j, v_j)$).

- $(\tilde{D}, st') \leftarrow$ OblivBinTree.Extract$(\tilde{H}_{tree}, st)$:

1. Use an oblivious sort to sort all leaves of $\tilde{H}_{tree}$ according their flag bit $b_j$ to obtain an array $\tilde{H}$.
  2. Set $\tilde{D}$ to be the first $N$ items of $\tilde{H}$.

Construction 7 (Oblivious Cuckoo Hash Bin). Let F be a pseudorandom function and (Gen, Enc, Dec) be a symmetric key encryption. We define an oblivious hash construction CuckooBin = (CuckooBin.Init, CuckooBin.Build, CuckooBin.Lookup, CuckooBin.Extract) as follows

- $(st, \tilde{D}) \leftarrow$ CuckooBin.Init $(D = (k_i, v_i)_{i=1}^{N})$:

1. Generate $N$ dummy items $(k'_i, \perp)_{i=N+1}^{2N}$ where $k'_i \in U_{dummy}$ and append them to $D$.
  2. Generate an encryption key SK and set $st \leftarrow$ SK.
  3. Set $\tilde{D} = \{ct_i = Enc(SK, (b_i, k_i, v_i))\}_{i=1}^{2N}$ where $b_i = 0$ if $k_i$ is real and $b_i = 1$ if $k_i$ is dummy. The real and dummy items are in any, not necessarily random, order.

- $(st, \tilde{H}_{cuckoo}, S) \leftarrow$ CuckooBin.Build $(\tilde{D} = \{(b_i, k_i, v_i)\}_{i=1}^{2N})$:

1. If $2N < \log^3 \lambda$, then return OblivBinTree.Build($\tilde{D}$).
  2. Generate PRF keys $K_1, K_2$ and encryption key SK $\leftarrow$ Gen($1^\lambda$), and set $st \leftarrow (K_1, K_2, SK)$.
  3. Run an oblivious algorithm to construct a Cuckoo hash table that consists of two tables $T_1, T_2$ and a stash S with parameters $K_1, K_2$, which contain the items of $\tilde{D}$. Set $\tilde{H}_{tree} \leftarrow (T_1, T_2, S)$.

- $(v, \tilde{H}'_{cuckoo}) \leftarrow$ CuckooBin.Lookup$(k_i, \tilde{H}_{cuckoo} = (T_1, T_2), S, st)$:

1. If $\tilde{H}_{cuckoo}$ is $\tilde{H}_{tree}$, then return OblivBinTree.Lookup$(k_i, \tilde{H}_{tree}, st)$.
  2. Access all items in S as well as items $T_1[F_{K_1}(k_i)]$ and $T_2[F_{K_2}(k_i)]$, decrypting them using SK and checking whether the stored items matches the search index $k_i$. If the item with index $k_i$ is found, set $v$ to be the corresponding data, and otherwise set $v \leftarrow \perp$.
  3. If either $T_1[F_{K_1}(i)]$ or $T_2[F_{K_2}(i)]$ is of the form $(b_i, k_i, v_i)$ write back an encryption of the value Enc(SK, $(2, k_i, v_i)$). Otherwise, write back an new encryption of Enc(SK, $(b_i, k_i, v_i)$). Set $\tilde{H}'_{tree}$ to be the table with the resulting changes.

- $(\tilde{D}, st') \leftarrow$ CuckooBin.Extract$(\tilde{H}_{cuckoo}, S, st)$:

1. If $\tilde{H}_{cuckoo}$ is $\tilde{H}_{tree}$, then return OblivBinTree.Extract($\tilde{H}_{tree}, st$).
  2. Use an oblivious sort together all items in $T_1, T_2$ and S according their flag bit $b_i$ to obtain an array $\tilde{H}$.
  3. Set $\tilde{D}$ to be the first $N$ items of $\tilde{H}$.

FIG. 6B

Construction 8. [Oblivious Hash Table] Let F be a pseudorandom function and (Gen, Enc, Dec) be a symmetric key encryption. Let $\mathcal{U} = \mathcal{U}_{real} \cup \mathcal{U}_{dummy}$ where $\mathcal{U}_{real}$ and $\mathcal{U}_{dummy}$ are two non-intersecting sets representing the real and dummy key identifiers. We define an oblivious hash construction OblivHT = (OblivHT.Init, OblivHT.Build, OblivHT.Lookup, OblivHT.Extract) as follows:

- $(st, \tilde{D}) \leftarrow \text{OblivHT.Init}(D = \{(k_i, v_i)\}_{i=1}^{N})$:

1. Generate encryption key $SK \leftarrow \text{Gen}(1^\lambda)$ and set $st \leftarrow SK$.
  2. Generate real items of the form $\{\text{Enc}(SK, (0, k_i, v_i))\}_{i=1}^{N}$ and additional $N$ dummy items of the form $\{\text{Enc}(SK, (1, k_i, \bot))\}_{i=N+1}^{2N}$.
  3. Compute an oblivious shuffle on the above $2N$ real and dummy items and set $\tilde{D}$ to be the result.

- $(st, \tilde{H}, \tilde{S}) \leftarrow \text{OblivHT.Build}(\tilde{D}, st)$: the data $\tilde{D}$ contains at most half of it real items and the rest are dummy items.

1. Return $(st, \tilde{H}, \tilde{S}) \leftarrow \text{OblivHT.BuildLevel}(\tilde{D}, N, N, 1, st)$.

- $(st, \tilde{H}, \tilde{S}) \leftarrow \text{OblivHT.BuildLevel}(\tilde{D}, R^{real}, R^{dummy}, \text{ctr}, SK)$:

1. Let $R = R^{real} + R^{dummy}$.
  2. If $R \leq \frac{\lambda}{\log \lambda}$, set $$(st^{cur}, \tilde{H}^{cur}, \tilde{S}^{cur}) \leftarrow \text{OblivBin.Build}(\tilde{D}).$$

Return $(st^{cur}, d), \tilde{H}^{cur}, \tilde{S}^{cur}$.

3. Otherwise, construct a level in the oblivious hash table as follows:
     (a) Let F be a PRF with output range $[\frac{R}{\log^c \lambda}]$. Generate a PRF key $K_{ctr}$.
     (b) Initialize $\frac{R}{\log^c \lambda}$ empty bins.
     (c) For each $i \in [R]$ append $\text{Enc}(SK, (k_i, i, v_i))$ to bin $F(K_{ctr}, i)$.
     (d) Let $\text{thrsh} = (1 - \delta)(\log^c \lambda)$.
     (e) Set $T = (1 - \delta) R^{real}$ and $t = \frac{R}{\log^c \lambda}$. For $1 \leq j \leq \frac{R}{\log^c \lambda}$ do as follows:
        i. Sample $R_j \leftarrow \text{Bin}(T, \frac{1}{t})$.
        ii. If there are less than $R_j$ real items $B_j$ or the total number of items assigned to $B_j$ were less than thrsh, abort.
        iii. Linearly scan the items assigned to $B_j$ in Step 3c, leaving the tags $b_i = 0$ to the first $R_j$ of the real items and setting the tag to rest to be $b_i = 2$; the dummy items stay with tag $b_i = 1$.
        iv. Obliviously shuffle the items assigned to $B_j$ according to their assigned tag. Move all items at the end of array starting from position thrsh + 1 to array $D_{next}$ changing the tag of the real items back to $b_i = 0$.
        v. Initialize a bin oblivious structure on the items left in $B_j$:

$$(st^{(cur,j)}, \tilde{H}^{(cur,j)}, \tilde{S}^{(cur,j)}) \leftarrow \text{OblivBin.Build}(B_j).$$

vi. Append the real items from $\tilde{S}^{(cur,j)}$ to $D_{next}$.
        vii. Set $T = T - R_j$ and $t = t - 1$.
     (f) Let $\tilde{H}^{cur} \leftarrow \{\text{Enc}(SK, st^{(cur,j)}), \tilde{H}^{(cur,j)}\}_{j=1}^{R/\log^c \lambda}$.
     (g) Call recursively the level building functionality on the remaining items in $D_{next}$:

$$(st', \tilde{H}', \tilde{S}) \leftarrow \text{OblivHT.BuildLevel}(D_{next}, |D_{next}|, \text{ctr} + 1, SK).$$

(h) Return $\tilde{H} \leftarrow (\tilde{H}^{cur}, \tilde{H}')$ and $st \leftarrow (SK, K_{ctr}, st')$

- $(v, \tilde{H}', \tilde{S}', st') \leftarrow$ OblivHT.Lookup$(k, \tilde{H}, \tilde{S}, st)$:
    1. Let d recorded in st be the number of levels in the OHT.
    2. Set found = 0, for ctr = d to 1, do the following:
        (a) If ctr = d, then do $$(v', \tilde{H}', \tilde{S}') \leftarrow \text{OblivBin.Lookup}(k, \tilde{H}^{(ctr)}, \tilde{S}^{(ctr)}, st^{(ctr)}),$$

If $v' \neq \bot$, set $v \leftarrow v'$ and found = 1.
        (b) If found = 0, set $j = F(K_{ctr}, k)$, else choose $j$ at random among the bins at level ctr.
        (c) Run $$(v', \tilde{H}', \tilde{S}') \leftarrow \text{OblivBin.Lookup}(k, \tilde{H}^{(ctr,j)}, \bot, st^{(ctr,j)}),$$

If $v' \neq \bot$, set $v \leftarrow v'$ and found = 1.

- $(\hat{D}, st') \leftarrow$ OblivHT.Extract$(\tilde{H}, st)$:
    1. Let d recorded in st be the number of levels in the OHT.
    2. For $1 \leq ctr \in [d]$ and $j \in [\frac{c \cdot N}{\log^2 \lambda}]$, let $$(\hat{D}_{ctr,j}, st') \leftarrow \text{OblivHT.Extract}(\tilde{H}^{(ctr,j)}, \tilde{S}, st^{(ctr,j)}),$$

for each bin $B_j$ in level ctr, where $\tilde{S} = \bot$ for ctr < d and otherwise, $\tilde{S}$ is the auxiliary array stored in $\tilde{H}$. Append $\hat{D}_{ij}$ to $\hat{D}$.

OBLIVIOUS RAM WITH LOGARITHMIC OVERHEAD

CROSS REFERENCE TO RELATED APPLICATIONS

This U.S. patent application is a continuation of, and claims priority under 35 U.S.C. § 120 from, U.S. patent application Ser. No. 16/365,224, filed on Mar. 26, 2019, which claims priority under 35 U.S.C. § 119(e) to U.S. Provisional Application 62/653,762, filed on Apr. 6, 2018. The disclosure of these prior applications are considered part of the disclosure of this application and are hereby incorporated by reference in their entireties.

TECHNICAL FIELD

This disclosure relates to oblivious random access memory with logarithmic overhead.

BACKGROUND

Enterprises and individuals are using distributed storage systems (i.e., cloud storage services) to store data on memory overlying multiple memory locations. Many of these enterprises and individuals encrypt their data before uploading onto the distributed storage system. In order to use essential functionalities offered by the cloud storage services, such as performing search queries on stored data, enterprises are required to provide plaintext access to the cloud storage services. As a result, many government and sensitive private sectors, such as health, finance, and legal, or reluctant to use cloud storage services, despite their increased convenience and cost advantages. Additionally, encryption alone may not suffice for ensuring data privacy, as the mere knowledge of data access patterns can provide a significant amount of information about the data without ever needing to decrypt the data.

SUMMARY

One aspect of the disclosure provides a method for concealing access patterns. The method includes executing, by data processing hardware, an instruction to execute a query (q) for a data block (B), the data block (B) associated with a corresponding memory level ($l_i$) of a logarithmic number of memory levels ($l_i$) of memory. Each memory level ($l_i$) includes physical memory ($RAM_i$) residing on memory hardware of a distributed system in communication with the data processing hardware. The method also includes retrieving, by the data processing hardware, a value (v) associated with the data block (B) from an oblivious hash table using a corresponding key (k), and extracting, by the data processing hardware, un-queried key value pairs (k, v) from the oblivious hash table associated with un-queried data blocks after executing a threshold number of queries (q) for data blocks. The method also includes executing, by the data processing hardware, a multi-array shuffle routine on the extracted key value pairs from the oblivious hash table to generate an output array containing the un-queried key value pairs (k, v).

Implementations of the disclosure may include one or more of the following optional features. In some implementations, executing the multi-array shuffle routine includes merging one or more input arrays of data blocks (B) each having a capacity less than a threshold capacity into a new array, and shuffling the new array obliviously. In some examples, the logarithmic number of memory levels ($l_i$) include a logarithmic number of memory levels ($l_i$) of increasing size where each memory level ($l_i$) has a storage capacity equal to the joint capacity of all preceding smaller memory levels ($l_i$) The instruction to execute the query (q) for the data block (B) may include a read or write operation on the data block and an address indicating a memory location for the data block (B). Here, when the instruction to execute the query (q) includes the write operation on the data block (B), the instruction to execute the query (q) for the data block (B) further includes data.

In some examples, the method also includes, when the corresponding memory level ($l_i$) associated with the data block (B) is not a lowest memory level ($l_j$), moving the data block (B) to the lowest memory level ($l_j$) after executing the instruction to execute the query (q). In these examples, after moving the data block (B) to the lowest memory level ($l_j$), the method may also include, updating, by the data processing hardware, a memory-level map in communication with the data processing hardware to indicate that the corresponding memory level ($l_i$) associated with the data block (B) now includes the lowest memory level ($l_j$).

[In some implementations, the data processing hardware resides on a client device. In these implementations, the client device may store a memory-level map in memory hardware of the client device. The memory-level map maps each data block stored on the memory hardware of the distributed system to a corresponding query memory level ($l_q$).

In some examples, the method also includes executing, by the data processing hardware, an instruction to execute a new query (q) for another data block (B), and determining, by the data processing hardware, whether the other data block (B) is stored locally on memory hardware of a client device. In these examples, when the other data block (B) is stored locally on the memory hardware of a client device, the method also includes retrieving, by the data processing hardware, the other data block (B) from the memory hardware of the client device. Additionally, when the other data block (B) is stored locally on the memory hardware of the client device, the method may also include, issuing, by the data processing hardware, one or more fake queries to the distributed system for retrieving a corresponding dummy block (D) to conceal the retrieval of the other data block (B) from the memory hardware of the client device.

Another aspect of the disclosure provides a system for concealing access patterns. The system includes data processing hardware, and memory hardware in communication with the data processing hardware and storing instructions, that when executed by the data processing hardware, cause the data processing hardware to perform operations. These operations include executing an instruction to execute a query (q) for a data block (B), the data block (B) associated with a corresponding memory level ($l_i$) of a logarithmic number of memory levels ($l_i$) of memory. Each memory level ($l_i$) includes physical memory ($RAM_i$) residing on a storage abstraction of a distributed system in communication with the data processing hardware. The operations also includes retrieving a value (v) associated with the data block (B) from an oblivious hash table using a corresponding key (k), and extracting un-queried key value pairs (k, v) from the oblivious hash table associated with un-queried data blocks after executing a threshold number of queries (q) for data blocks. The operations also include executing a multi-array shuffle routine on the extracted key value pairs from the oblivious hash table to generate an output array containing the un-queried key value pairs (k, v).

This aspect may include one or more of the following optional features. In some implementations, executing the multi-array shuffle routine includes merging one or more input arrays of data blocks (B) each having a capacity less than a threshold capacity into a new array, and shuffling the new array obliviously. In some examples, the logarithmic number of memory levels ($l_i$) include a logarithmic number of memory levels ($l_i$) of increasing size where each memory level ($l_i$) has a storage capacity equal to the joint capacity of all preceding smaller memory levels ($l_i$). The instruction to execute the query (q) for the data block (B) may include a read or write operation on the data block and an address indicating a memory location for the data block (B). Here, when the instruction to execute the query (q) includes the write operation on the data block (B), the instruction to execute the query (q) for the data block (B) further includes data.

In some implementations, the operations also include, when the corresponding memory level ($l_i$) associated with the data block (B) is not a lowest memory level ($l_l$), moving the data block (B) to the lowest memory level ($l_l$) after executing the instruction to execute the query (q). In these implementations, after moving the data block (B) to the lowest memory level ($l_l$), the operations may also include, updating a memory-level map in communication with the data processing hardware to indicate that the corresponding memory level ($l_i$) associated with the data block (B) now includes the lowest memory level ($l_l$).

The data processing hardware and the memory hardware may reside on a client device. In some examples, the client device stores a memory-level map in the memory hardware of the client device. The memory-level map maps each data block stored on the memory hardware of the distributed system to a corresponding query memory level ($l_q$).

In some examples, the operations also include executing an instruction to execute a new query (q) for another data block (B) and determining whether the other data block (B) is stored locally on memory hardware of a client device. In these examples, when the other data block (B) is stored locally on the memory hardware of a client device, the operations also includes retrieving the other data block (B) from the memory hardware. Additionally, when the other data block (B) is stored locally on the memory hardware of the client device, the operations may also include, issuing one or more fake queries to the distributed system for retrieving a corresponding dummy block (D) to conceal the retrieval of the other data block (B) from the memory hardware.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3 provides a schematic view of an example memory-level map.

FIG. 4 provides an example algorithm for executing an initialization phase and an access phase of an O-RAM routine.

FIGS. 5A and 5B provide example algorithms for executing an oblivious multi-array shuffle routine.

FIG. 6A provides an example algorithm for constructing an oblivious bin tree.

FIG. 6B provides an example algorithm for constructing an oblivious cuckoo hash bin.

FIGS. 6C and 6D provide an example algorithm for constructing an oblivious hash table.

Like reference symbols in the various drawings indicate like elements.

DETAILED DESCRIPTION

Figure 1A:
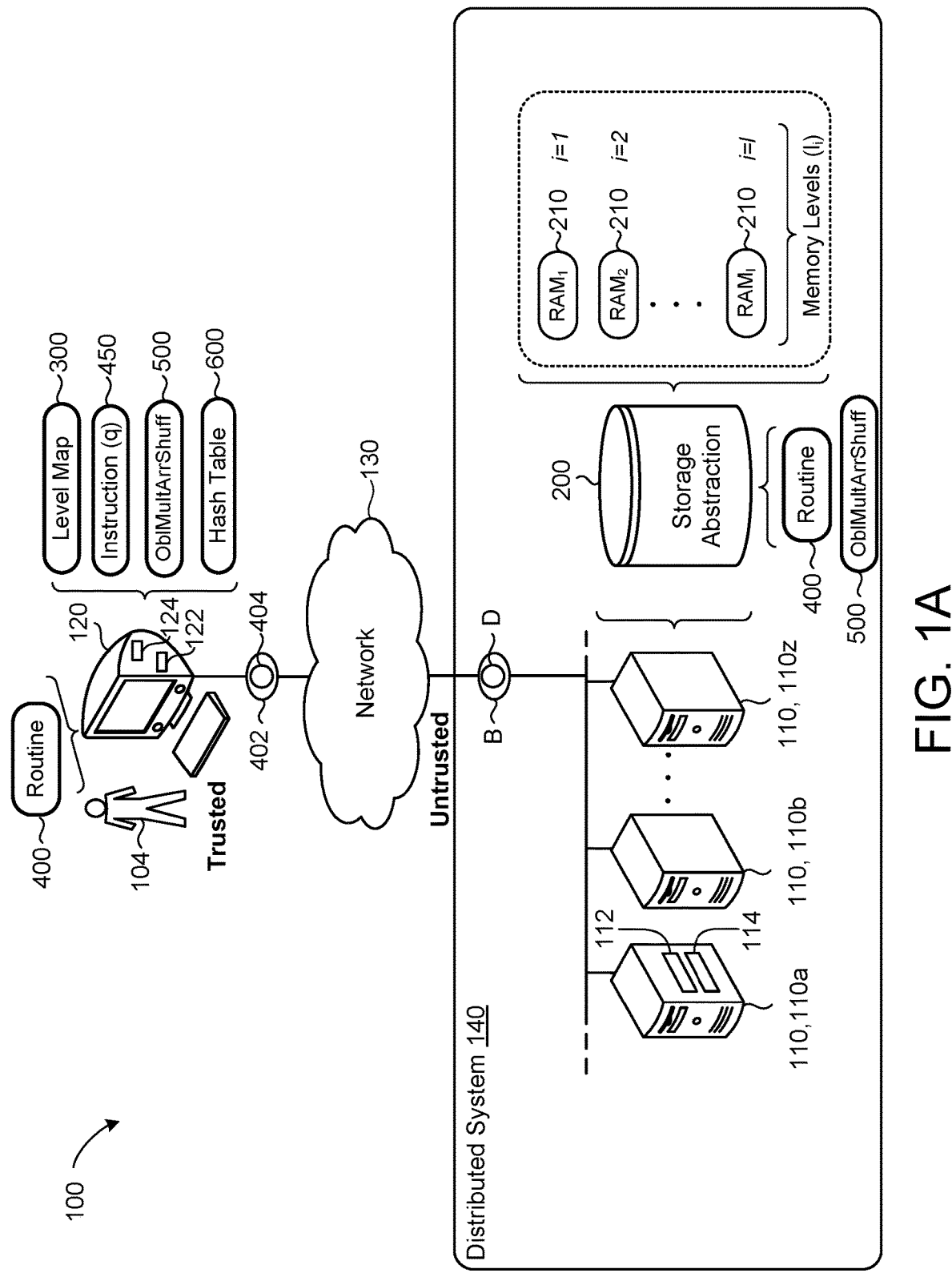
FIGS. 1A and 1B are schematic views of an example system using oblivious hash functions and an oblivious multi-array shuffle for storing and moving data blocks obliviously on non-transitory data storage of a distributed system.
Figure 1B:
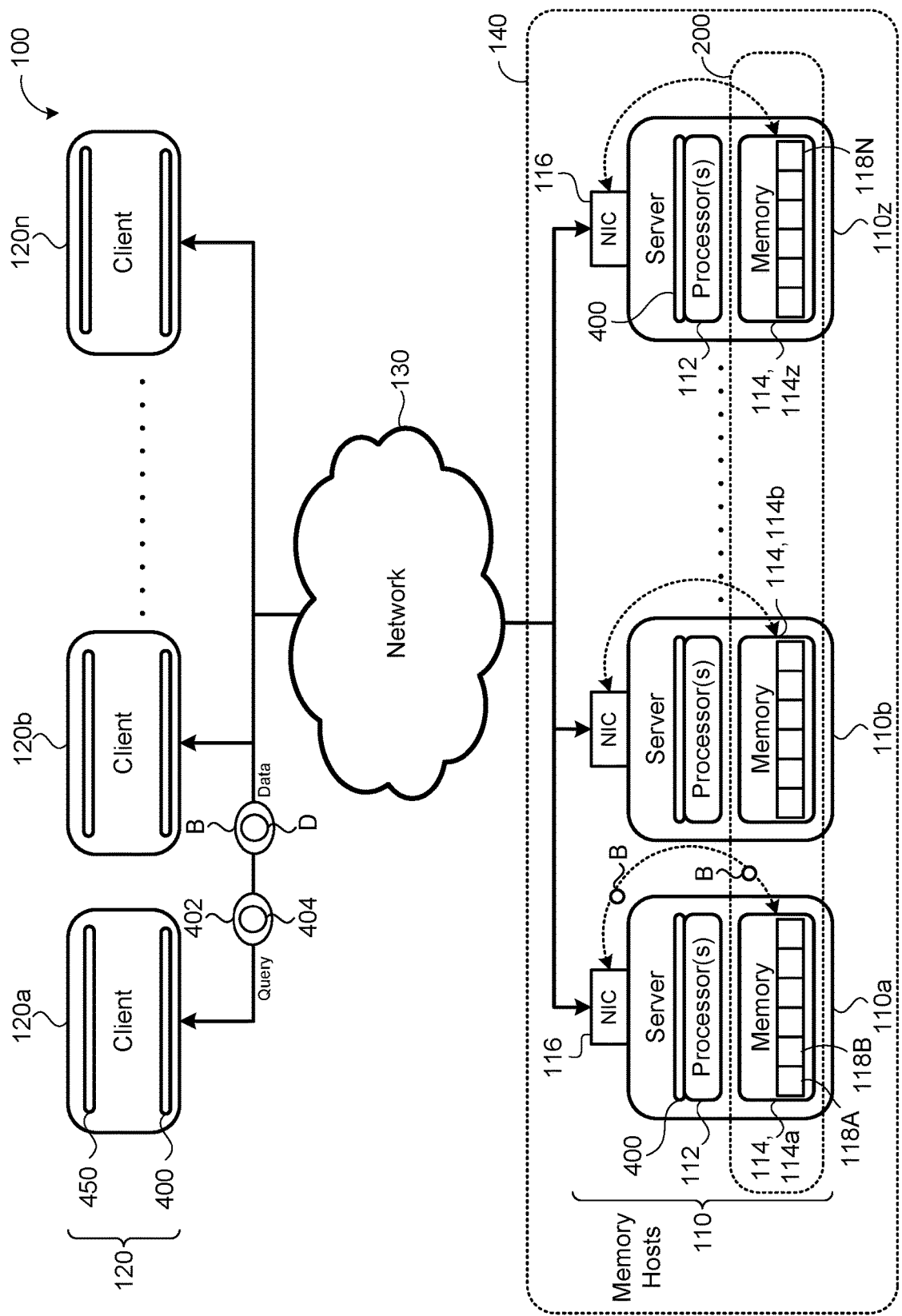

FIGS. 1A and 1B depict an example system 100 for storing N data blocks (B) owned by a client 104 on a distributed system 140 and obliviously moving the data blocks (B) around the distributed system 140 to conceal access patterns while preserving search functionalities on the data blocks by the client 104. A client device 120 (e.g., a computer) associated with the client 104 communicates, via a network 130, with the distributed system 140 having a scalable/elastic non-transitory storage abstraction 200. The client device 120 may include associated memory hardware 122 and associated data processing hardware 124. The storage abstraction 200 (e.g., key/value store, file system, data store, etc.) is overlain on storage resources 114 to allow scalable use of the storage resources 114 by one or more client devices 120.

In some implementations, the distributed system 140 executes a computing device 112 that manages access to the storage abstraction 200. For instance, the client device 120 may encrypt and store the data blocks (B) on the storage abstraction 200, as well as retrieve and decrypt the data blocks (B) from the storage abstraction 200. While the example shown depicts the system 100 having a trusted side associated with the client device 120 in communication, via the network 130, with an untrusted side associated with the distributed system 140, the system 100 may be alternatively implemented on a large intranet having a trusted computing device(s) (CPU) and untrusted data storage.

In some implementations, the distributed system 100 includes resources 110, 110a-z. The resources 110 may include hardware resources 110 and software resources 110. The hardware resources 110 may include computing devices 112 (also referred to as data processing devices and data processing hardware) or non-transitory memory 114 (also referred to as memory hardware and storage resources). The software resources 110 may include software applications, software services, application programming interfaces (APIs) or the like. The software resources 110 may reside in the hardware resources 110. For example, the software resources 110 may be stored in the memory hardware 114 or the hardware resources 110 (e.g., the computing devices 112) may be executing the software resources 110.

A software application (i.e., a software resource 110) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The memory hardware 114, 122 may be physical devices used to store programs (e.g., sequences of instructions) or data (e.g., program state information) on a temporary or permanent basis for use by a computing device 112 and/or a client device 120 (i.e., the data processing hardware 124 of the client device 120). The memory hardware 114, 122 may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), oblivious random access memory (ORAM), dynamic random access memory (DRAM), static random access memory (SRAM), phase change memory (PCM) as well as disks or tapes.

The network 130 may include various types of networks, such as local area network (LAN), wide area network (WAN), and/or the Internet. Although the network 130 may represent a long range network (e.g., Internet or WAN), in some implementations, the network 130 includes a shorter range network, such as a local area network (LAN). In some implementations, the network 130 uses standard communications technologies and/or protocols. Thus, the network 130 can include links using technologies, such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, Bluetooth, Bluetooth Low Energy (BLE), etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 130 uses custom and/or dedicated data communications technologies instead of, or in addition to, the ones described above.

The data blocks (B) correspond to atomic units of data and each have size B bytes each. For example, a typical value for B for storage on a distributed system may be 64 KB to 256 B. A notation N denotes a total number of the data blocks (B) associated with the client 104 and stored on the storage abstraction 200 using Oblivious Random Access Memory (O-RAM). Each of the N data blocks is stored at a corresponding memory location 118, 118A-N (FIG. 1B) of the storage abstraction 200 overlain across the memory hardware 114.

In some implementations, the client device 120 and the distributed system 140 execute an O-RAM routine 400 for obliviously storing and moving encrypted data blocks (B) across the memory locations 118 of the storage abstraction 200 to completely hide data access patterns (which data blocks (B) were read/written) from the distributed system 140. During an initialization phase, the O-RAM routine 400 may cause the distributed system 140 to allocate new memory locations 118 of the storage abstraction 200 for storing encrypted data blocks (B) and organize/divide/partition the storage abstraction 200 into multiple arrays L ($A_1$, $A_2$, ..., $A_L$) each having sizes $N_1$, $N_2$, ..., $N_L$, wherein $N_i \geq N_{i+1}$ for i=1, ..., L−1. Each array L is randomly permuted by a permutation not known by the distributed system 140 storing the arrays L. During an access phase, the O-RAM routine 400 allows the client device 120 to access (read/write) and encrypted data block (B) stored on the storage abstraction 200 by executing an instruction 450 on the data processing hardware 124 of the client device 120 to execute a query (q) for the data block (B). The instruction 450 may indicate an operation (read or write), an address of the memory location 118 storing the data block (B), and the data block (B) when the operation is a write operation. By executing the instruction 450, the client device 120 is able to retrieve the data block (B) without revealing the contents of the data block (B) as well as the sequence of the query (q) executed by the client device 120 to the distributed system 140. Further, execution of the instruction 450 completely hides data access patterns (which data blocks (B) were read/written) from the distributed system 140.

Referring to FIG. 1B, in some implementations, the distributed storage system 140 includes loosely coupled memory hosts 110, 110a-z (e.g., computers or servers), each having a computing resource 112 (e.g., one or more processors or central processing units (CPUs)) in communication with storage resources 114, 114a-z (e.g., memory hardware, memory hardware, flash memory, dynamic random access memory (DRAM), phase change memory (PCM), and/or disks) that may be used for caching data. The storage abstraction 200 overlain on the storage resources 114 allows scalable use of the storage resources 114 by one or more client devices 120, 120a-n. The client devices 120 may communicate with the memory hosts 110 through the network 130 (e.g., via remote procedure calls (RPC)).

In some implementations, the distributed storage system 140 is "single-sided," eliminating the need for any server jobs for responding to real and/or fake queries 402, 404 from client devices 120 to retrieve data blocks (B) and/or dummy blocks (D) from the storage abstraction 200 when the client devices 120 execute instructions 450 to execute queries (q) for data blocks (B). "Single-sided" refers to the method by which most of the request processing on the memory hosts 110 may be done in hardware rather than by software executed on CPUs 112 of the memory hosts 110. Additional concepts and features related to a single-sided distributed caching system can be found in U.S. Pat. No. 9,164,702, which is hereby incorporated by reference in its entirety.

The distributed system 140 may obliviously move data blocks (B) around the storage resources 114 (e.g., memory hardware) of the remote memory hosts 110 (e.g., the storage abstraction 200) and get the data blocks (B) from the remote memory hosts 110 via RPCs or via remote direct memory access (RDMA)-capable network interface controllers (NIC) 116. A network interface controller 116 (also known as a network interface card, network adapter, or LAN adapter) may be a computer hardware component that connects a computing device/resource 112 to the network 130. Both the memory hosts 110a-z and the client device 120 may each have a network interface controller 116 for network communications. The O-RAM route 400 executing on the physical processor 112 of the hardware resource 110 registers a set of remote direct memory accessible regions/ locations 118A-N of the memory (storage resources) 114 with the network interface controller 116. Each memory location 118 is configured to store a corresponding data block (B).

In some implementations, when the client device 120 executes the instruction 450 to execute the query (q) for a data block (B) and determines that the data block (B) is stored locally at the memory hardware 122 of the client device 120, the client device 120 retrieves the data block (B) from the memory hardware 122 and sends one or more fake queries 404 to the NIC 116 for retrieving corresponding dummy blocks (D) to conceal the retrieval of the data block (B) from the local memory hardware 122. The client device 120 may discard each retrieved dummy block (D). On the other hand, if the client device 120 determines that the data block (B) is stored on the storage abstraction 200, the client device 120 may send a real query 402 to the NIC 116 for retrieving the corresponding data block (D) from the storage abstraction 200.

Referring back to FIG. 1A, the client device 120 stores a memory-level map 300 locally in the memory hardware 122 that maps memory levels ($l_i$) of memory 118, 122, 200. The memory levels ($l_i$) provide a hierarchical oblivious structure that includes a logarithmic number of memory levels ($l_i$) of increasing size where each memory level ($l_i$) has a storage capacity equal to the joint capacity of all preceding smaller memory levels ($l_i$). Each memory level ($l_i$) includes physical memory ($RAM_i$) 210 residing on the storage abstraction 200 (e.g., memory hardware 114) of the distributed system 140.

Figure 2:
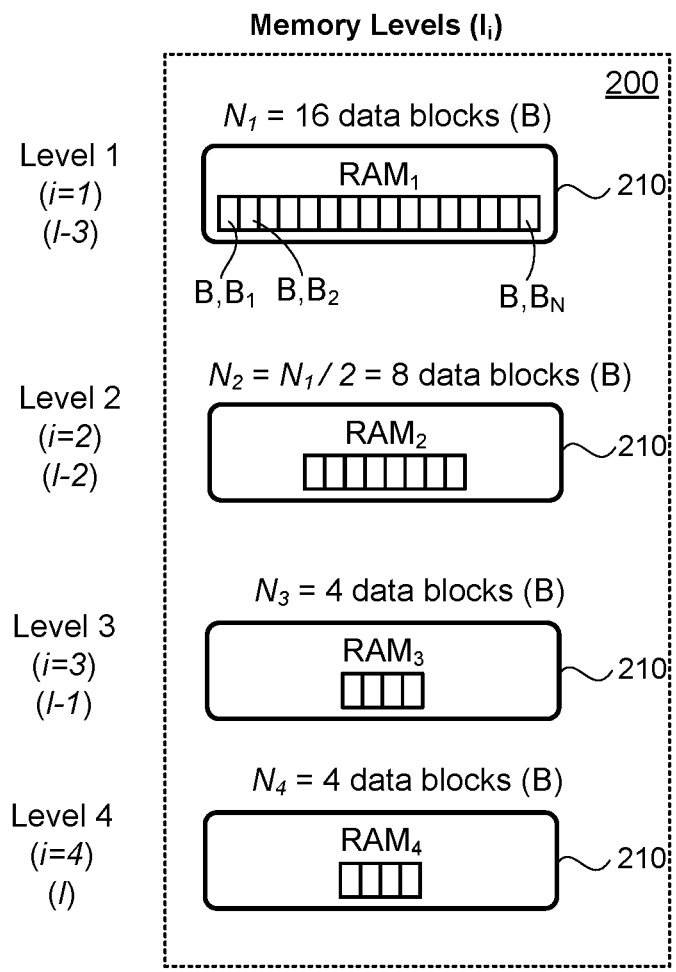
FIG. 2 provides a schematic view of an example logarithmic number of memory levels of non-transitory memory.

FIG. 2 provides a schematic view of example memory levels ($l_i$) that includes four logarithmic levels of memory 200. The four levels may be extended to log N levels $$\{l_i\}_{i=\alpha}^{\log N}$$

of size $2^i$ where 2 is equal to O(log N) for a RAM capacity of N data blocks (B) of size B. The first level (Level 1) (i=1) includes physical memory ($RAM_1$) 210 storing all of the N data blocks (B) and resides on the storage abstraction 200 of the distributed system 140. The $RAM_1$ includes a size of $N_1$ data blocks (B) and corresponds to a capacity equal to a joint capacity of each of the preceding smaller levels (Level 2, Level 3, and Level 4). In the example shown, the value for $N_1$ is equal to 16 data blocks (B), ($B_1$-$B_N$) stored in $RAM_1$.

The second level (Level 2) (i=2) includes physical memory ($RAM_2$) 210 residing on the storage abstraction 200 of the distributed system 114. The $RAM_2$ includes a size of $N_2$ data blocks (B) and corresponds to a capacity equal to a joint capacity of each of the preceding smaller levels (Level 3 and Level 4). Since $N_1$ corresponds to the joint capacity of all the preceding smaller levels, $N_2$ is equal to the value of $N_1$ divided by two (i.e., $N_2=N_1/2$) such that the size capacity of $N_2$ data blocks (B) stored in $RAM_2$ of Level 2 decreases by half from the size/capacity of $N_1$ data blocks (B) stored in $RAM_1$ of Level 1. In the example shown, the value for $N_2$ is equal to 8 data blocks (B) stored in $RAM_2$.

The third level (Level 3) (i=3) includes physical memory ($RAM_3$) 210 residing on the storage abstraction 200 of the distributed system 114. The $RAM_3$ includes a size of $N_3$ data blocks (B) and corresponds to a capacity equal to a capacity of the preceding smallest fourth level (Level 4). Since $N_2$ corresponds to the joint capacity of all the preceding smaller levels (Level 3 and Level 4), $N_3$ is equal to the value of $N_2$ divided by two (i.e., $N_3=N_2/2$) such that the size/capacity of $N_3$ data blocks (B) stored in $RAM_3$ of Level 3 decreases by half from the size/capacity of $N_2$ data blocks (B) stored in $RAM_2$ of Level 2. In the example shown, the value for $N_3$ is equal to 4 data blocks (B) stored in $RAM_3$.

The fourth level (Level 4) (i=4) includes physical memory ($RAM_4$) 210 that may reside on the storage abstraction 200 of the distributed system 114 or on the memory hardware 122 of the client device 120. As the memory levels ($l_i$) include four levels, the fourth level (Level 4) corresponds to a lowest memory level ($l_l$). The fourth level (Level 4) may correspond to a receiving level that receives new data blocks (B) stored in the $RAM_4$ at the fourth level. The $RAM_4$ includes a size $N_4$ data blocks (B). Since $N_3$ has the capacity of the fourth level (Level 4), $N_4$ is equal to the value of $N_3$ such that the size/capacity of $N_4$ data blocks (B) stored in $RAM_4$ of Level 4 is equal to the size/capacity of $N_3$ data blocks (B) stored in $RAM_3$ of Level 3. In the example shown, the value for $N_4$ is equal to 4 data blocks (B) stored in $RAM_4$. In some examples, a stash or shelter of virtual memory may reside on the memory hardware 122 at the client device 120 for storing the new data blocks (B) added to the $RAM_4$ at the fourth level.

In some examples, only data blocks (B) (e.g., items) assigned to the smallest/lowest memory level ($l_l$) in the hierarchy (e.g., Level 4 in the example of FIG. 2) can be accessed more than once from the corresponding level. For each other level, once the user device 120 accesses a data block (B) from the corresponding level (i.e., by executing the instruction 450), the data block (B) moves to the smallest/lowest memory level ($l_l$) in the hierarchy. Once a memory level ($l_i$) reaches capacity (e.g., the level is full), the number of data blocks (B) assigned to that level move to an adjacent larger/higher memory level (l−1) in the hierarchy. Accordingly, adding new data blocks to the receiving level ($l_l$) can result in the level becoming full, thereby invoking a change of steps that moves data blocks (B) toward the larger memory levels ($l_i$) in the hierarchy of logarithmic levels of memory 200. In a worst case scenario, the change of steps may result in moving data blocks (B) across all of the memory levels ($l_i$) in the hierarchy until reaching the largest memory level (e.g., Level 1 in the example of FIG. 2).

FIG. 3 provides a schematic view of an example memory-level map 300 residing at the client device 120 for mapping the memory levels ($l_i$) of the memory 200. In the example shown, the example memory-level map 300 maps the four memory levels ($l_i$) of FIG. 2. The memory-level map 300 maps each data block (B), ($B_1$-$B_N$) to a corresponding query memory level ($l_q$) associated with a lowest one of the memory levels ($l_i$) at which the corresponding data block (B) of the executed query (q) is stored. For instance, data blocks ($B_1$, $B_N$) each include a corresponding query memory level ($l_q$) equal to Level 1 indicating that the data blocks ($B_1$, $B_N$) are stored in $RAM_1$. Thus, if the client device 120 executes a query (q) for either of the data blocks ($B_1$, $B_N$), the client device 120 will send a real query 402 to $RAM_1$ residing at the storage abstraction 200 to retrieve the requested data blocks ($B_1$, $B_N$).

Data block ($B_2$) includes a corresponding query memory level ($l_q$) equal to Level 4 indicating that the data block ($B_2$) is stored in in the lowest memory level ($l_l$) corresponding to $RAM_4$. Thus, if the client device 120 executes a query (q) for the data block ($B_2$), the client device 120 will send a real query 402 to $RAM_4$ residing at the storage abstraction 200 to retrieve the requested data blocks ($B_3$).

Data block ($B_3$) includes a corresponding query memory level ($l_q$) equal to Level 3 indicating that the data block ($B_3$) is stored in $RAM_3$. Thus, if the client device 120 executes a query (q) for the data block ($B_3$), the client device 120 will send a real query 402 to $RAM_3$ residing at the storage abstraction 200 to retrieve the requested data blocks ($B_3$).

Data block ($B_4$) includes a corresponding query memory level ($l_q$) equal to Level 2 indicating that the data block ($B_4$) is stored in $RAM_2$. Thus, if the client device 120 executes a query (q) for the data block ($B_4$), the client device 120 will send a real query 402 to $RAM_4$ residing at the storage abstraction 200 to retrieve the requested data blocks ($B_4$).

In some implementations, when query memory level ($l_q$) is not the lowest memory level ($l_l$) (i.e., $lq \neq l_l$) (e.g., Level 4), the client device 120 updates the memory-level map 300 to indicate that the retrieved data block (B) is now stored in $RAM_4$ of the lowest memory level ($l_l$). In the example shown, when the client device 120 retrieves a data block (B) from the storage abstraction 200 (e.g., $RAM_1$, $RAM_2$, or $RAM_3$) having a corresponding query memory level ($l_q$) less than the lowest memory level ($l_l$), the retrieved data block (B) moves to the lowest memory level ($l_l$) (Level 4) corresponding to $RAM_4$ and the client device 120 updates the memory-level map 300 to indicate that the retrieved data block (B) now includes a corresponding query memory level ($l_q$) equal to Level 4, i.e., the lowest memory level ($l_l$).

FIG. 4 provides an example algorithm associated with execution of the O-RAM routine 400. As set forth above, the O-RAM routine 400 includes an initialization phase (ORAM.Init) and an access phase (ORAM.Acess). The O-RAM routine 400 may use an oblivious hash table 600 (FIGS. 1, 6C, and 6D) for obliviously moving and storing the N data blocks (B) across the hierarchy of logarithmic memory levels ($l_i$) of the storage abstraction 200. For example, the O-RAM routine 400 may initialize (OblivHT.Init) and build (OblivHT.Build) the oblivious hash table 600 containing the whole database D (i.e., memory levels ($l_i$)) of N data blocks (B) during the initialization phase (ORAM.Init). During the access phase, the O-RAM routine 400 may execute a lookup (OblivHT.Lookup) in the hash table 600 by using a key k to retrieve a corresponding value v associated with a queried data block (B). The key k may be set to the address specified in the query instruction 400 for the queried data block (B). (e.g., key) associated with an address (addr) specified in a corresponding query instruction 400 for a data block (B) associated. The O-RAM routine 400 may further invoke an oblivious shuffle (ORAM.Shuffle) that executes an extraction phase (OblivHT.Extract) of the oblivious hash table 600, an oblivious multi-array shuffle routine (OblivMultArrShuff) 500 (FIGS. 1A, 5A and 5B), and a subsequent build phase (OblivHT.Build) in order to construct an updated oblivious hash table 600. The extraction phase (OblivHT.Extract) of the oblivious hash table 600 extracts data blocks (B) from each level in the oblivious hash table 600 after execution of a number of queries (i.e., instructions 400) to output a database containing only un-queried items ($k_i$, $v_i$) and padded to size N.

Referring back to FIG. 1A, in some implementations, the client device 120 and the distributed system 140 execute the oblivious multi-array shuffle routine (OblivMultArrShuff) 500 (also referred to as "shuffle routine 500") configured to leverage entropy of the multiple input arrays L ($A_1$, $A_2$, . . . , $A_L$) for the N data blocks (B) stored on the storage abstraction 200. In some examples, the shuffle routine 500 assumes that each input array L has been previously shuffled in an order unknown by the untrusted server during the initialization phase of the O-RAM routine 400. This assumption provides gains in efficiency. Moreover, the shuffle algorithm attains improved efficiency over general oblivious sorting algorithms under a restriction that there exists L'=O (log log λ) such that $$|A_{L'}| + \ldots + |A_L| = O\left(\frac{N \log\log \lambda}{\log N}\right).$$

The shuffle routine 500 may sample a random permutation from each input array L as well as a random Assign function that merges the elements (e.g., data blocks (B)) from separate arrays. Thereafter, the shuffle routine 500 may obliviously apply the sampled Assign function to the previously shuffled input arrays L ($A_1$, $A_2$, . . . , $A_L$). Accordingly, the shuffle routine 500 does not have the task of hiding the access pattern within each of the input arrays since the shuffle routine 500 assumes that they are already shuffled. In order to provide access pattern obliviousness for access patterns with non-repeating entries, the shuffle routine 500 may partition an output array configured to contain a number of data blocks (B) from each input array that is proportional to a fraction of a total number of data blocks (B) assigned to that input array. For instance, the shuffle routine 500 may retrieve an upper bound limit of data blocks (B) from each input array that are assigned to the output array partition and hide the exact number of data blocks (B) retrieved from each array. These accesses are obliviously since the shuffle routine 500 is not concerned with hiding access patterns within each array. In fact, by partitioning the output array, the shuffle routine 500 is generating a random permutation on the fly that permits retrieval of the first data blocks (B) in each of the input arrays.

After retrieving the data blocks (B) assigned to the output array, the shuffle routine 500 sorts the retrieved data blocks (B) obliviously in order to separate the exact number of data blocks (B) retrieved from each input array without revealing these numbers. The oblivious sorting of the retrieved data blocks (B) assigns the retrieved data blocks (B) to corresponding positions within the output array. Leftover data blocks (B) (e.g., remaining data blocks (B)) in each input array that were not retrieved for assignment to the output array remain in their corresponding input arrays and padded to hide their exact sizes. Thereafter, the shuffle routine 500 may recursively shuffle each of the input arrays containing the leftover data blocks (B). Here, the oblivious sorting is upon small arrays that are of size $O(\log^3 \lambda)$ while performing $$O\left(\frac{N}{\log^3 \lambda}\right)$$

of these shuffles. Accordingly, the total shuffle cost remains O(N log log λ).

In some implementations, building the oblivious multi-array shuffle routine 500 includes a first step function (OblMultArrShuff) of merging all input arrays L ($A_1$, $A_2$, . . . , $A_L$) that include a size below a size threshold and shuffle them obliviously into a new input array, while simultaneously updating the Assign function mapping which was sampled at random. After the input arrays are shuffled, a second step function (OblMultArrShuff.Shuffle) of the shuffle routine 500 includes slicing the input arrays and the output array in order to initialize each of the partitions of the output arrays using the corresponding data blocks (B) retrieved from the input arrays. Here, the assignment of the data blocks (B) retrieved from each of the input arrays to corresponding partitions in the output array is executed using a wrapping function (OblMultArrShuff.BinShuffle) that wraps the functionality of obliviously shuffling the data blocks (B) retrieved from the input arrays into the output array. The wrapping function (OblMultArrShuff.BinShuffle) is further configured to return leftover input arrays that include leftover/unassigned data blocks (B) from the input arrays that will be subsequently shuffled using the second step (OblMultArrShuff.Shuffle) of the shuffle routine 500. FIGS. 5A and 5B provide an example oblivious multi-array shuffle routine 500 executing the first and second step functions OblMultArrShuff, OblMultArrShuff.Shuffle (FIG. 5A) and the wrapping function OblMultArrShuff.BinShuffle (FIG. 5B).

In some implementations, the O-RAM routine 400 initializes oblivious hash tables 600 in order to achieve hierarchical structure of logarithmic memory levels ($l_i$) of increasing size (e.g., shown in FIG. 2) when shuffling/moving the data blocks (B) between different memory levels ($l_i$). The oblivious hash tables 600 allow one time access to the items (e.g., data blocks (B)) associated therewith for use in storing the items at each memory level ($l_i$) of the hierarchical structure. Here, the O-RAM routine 400 leverages entropy associated data blocks (B) in each of the memory levels ($l_i$) that were not queried in order to more efficiently merge and shuffle the un-queried data blocks (B) in two memory levels ($l_i$). Specifically, an extract algorithm associated with the oblivious hash tables 600 separates the un-queried and queried items in each table, and thereafter, the multi-array shuffle routine 500 shuffles the arrays that include the un-queried items in each level for initializing a new joint has table. As the un-queried items (e.g., data blocks (B)) are already shuffled during a previous initialization of the oblivious hash table in their corresponding memory level ($l_i$) and the oblivious hash table query algorithm reveals information access pattern information about the items that were queried.

An oblivious hash table (OblivHT) may be defined by an initialization phase (OblivHT.Init), a build phase (OblivHT.Build), a lookup phase (OblivHT.Lookup), and an extraction phase (OblivHT.Extract) as follows:
- ($\tilde{D}$, st)←OblivHT.Init(D): an algorithm that takes as input an array of key-value pairs D={$(k_i, v_i)$}$_{i=1}^{N}$ and outputs a processed version of it $\tilde{D}$.
- ($\tilde{H}$, st')←OblivHT.Build($\tilde{D}$, st): an algorithm that takes as input a processed database $\tilde{D}$ and a state and initializes the hash table $\tilde{H}$ and updates the state st.
- (v, $\tilde{H}'$, st')←OblivHT.Lookup(k, $\tilde{H}$, st): an algorithm that takes as input the oblivious has table and the state produced in the build phase and a lookup key and outputs the value $v_i$ corresponding to the key $k_i$ together with updated hash table $\tilde{H}'$ and state st'.
- ($\tilde{D}$, st')←OblivHT.Extract($\tilde{H}$, $\tilde{S}$, st): an algorithm that takes the hash table and the state after the execution of a number of queries and outputs a database, which contains only the un-queried items ($k_i$, $v_i$)∈D and is padded to size N.

In some implementations, the O-RAM routine 400 modifies the oblivious hash table 600 with oblivious bins for data (B) of a smaller size. Similar to the oblivious hash table (OblivHT), an oblivious bin (OblivBin) may be defined by an initialization phase (OblivBin.Init), a build phase (OblivBin.Build), a lookup phase (OblivBin.Lookup), and an extraction phase (OblivBin.Extract) as follows:
- ($\tilde{D}$, st)←OblivBin. Init(D): an algorithm that takes as input an array of key-value pairs D={$(k_i, v_i)$}$_{i=1}^{N}$ and outputs a processed version of it $\tilde{D}$.
- ($\tilde{S}$, $\tilde{H}$, st')←OblivBin.Build($\tilde{D}$, st): an algorithm that takes as input a processed database $\tilde{D}$ and a state, initializes the hash table $\tilde{H}$ and an additional array $\tilde{S}$, and updates the state st.
- (v, $\tilde{S}$, $\tilde{H}'$, st')←OblivBin. Lookup(k, $\tilde{H}$, $\tilde{S}$, st): an algorithm that takes as input the oblivious has table and the state produced in the build phase and a lookup key and outputs the value $v_i$ corresponding to the key $k_i$ together with updated hash table $\tilde{H}'$ and state st'.
- ($\tilde{D}$, st')←OblivHT.Extract($\tilde{H}$, st): an algorithm that takes the hash table and the state after the execution of a number of queries and outputs a database, which contains only the un-queried items ($k_i$, $v_i$)∈D and is padded to size N.

Different schemes may be utilized for instantiating oblivious bins for use in building the oblivious hash table 600. In some examples, for oblivious hash tables 600 associated with logarithmic complexity during look up, an oblivious bin tree may provide a structure for sets of small sizes. FIG. 6A provides an example algorithm 600a for constructing an oblivious bin tree. FIG. 6B provides an example algorithm 600b for constructing an oblivious cuckoo hash bin. Thereafter, the oblivious hash table 600 having O(N log log λ) lookup complexity may be constructed using either of the oblivious bin constructions of FIG. 6A or 6B.

In some implementations, the oblivious hash table 600 uses additional dummy items for providing oblivious properties of the hash table 600 without allowing an adversary to select the dummy items in challenge query sequences. Moreover, construction of the oblivious hash table 600 may assume that the input for the build phase (OblivHT.Build) includes both real and dummy items shuffled together at random. Here, the output of the extract phase (OblivHT.Extract) will also include un-queries real items mixed with a number of dummy items. FIGS. 6C and 6D provide an example algorithm 600c for constructing the oblivious hash table 600.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 7:
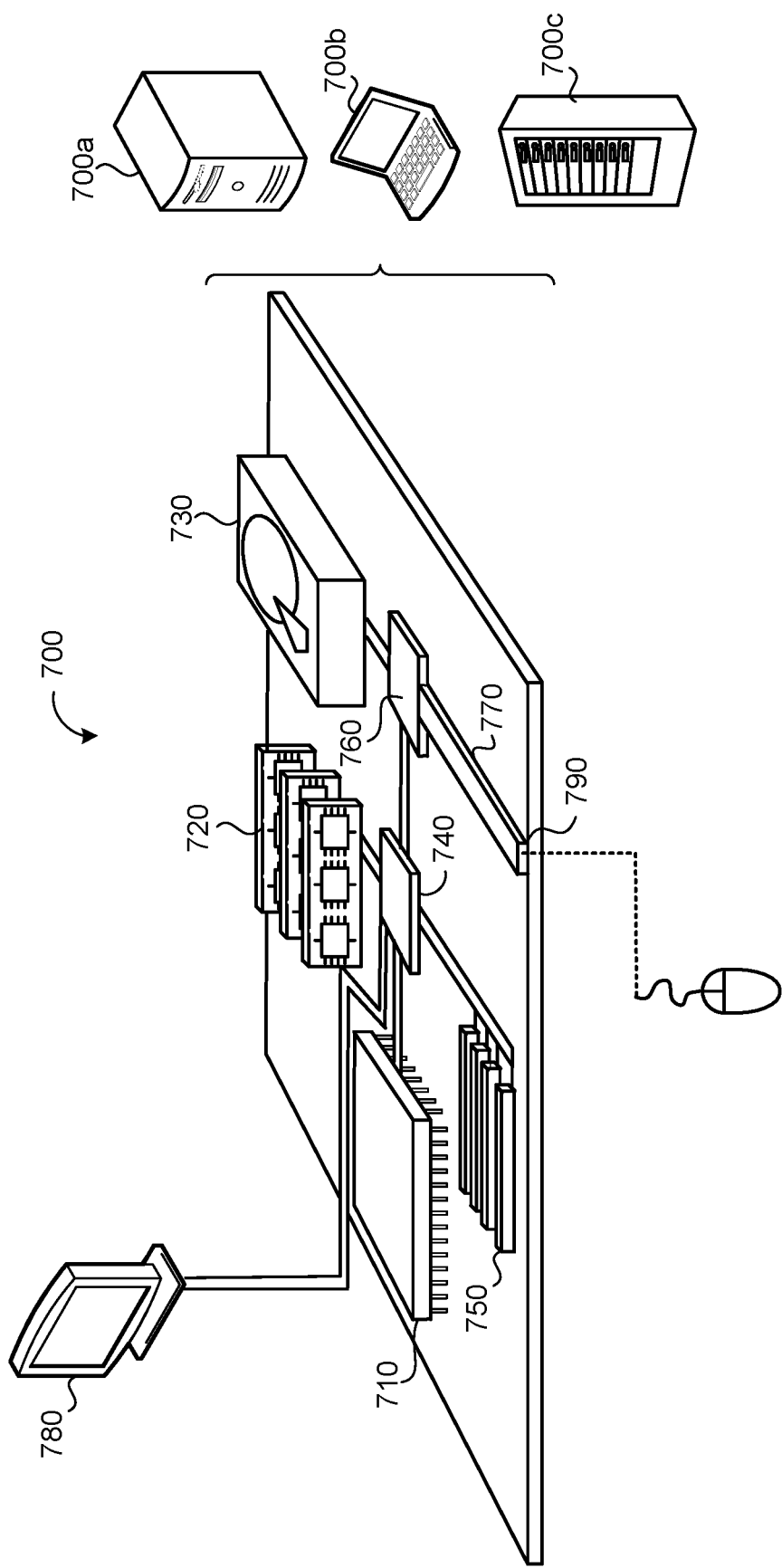
FIG. 7 is a schematic view of an example computing device.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Figure 8:
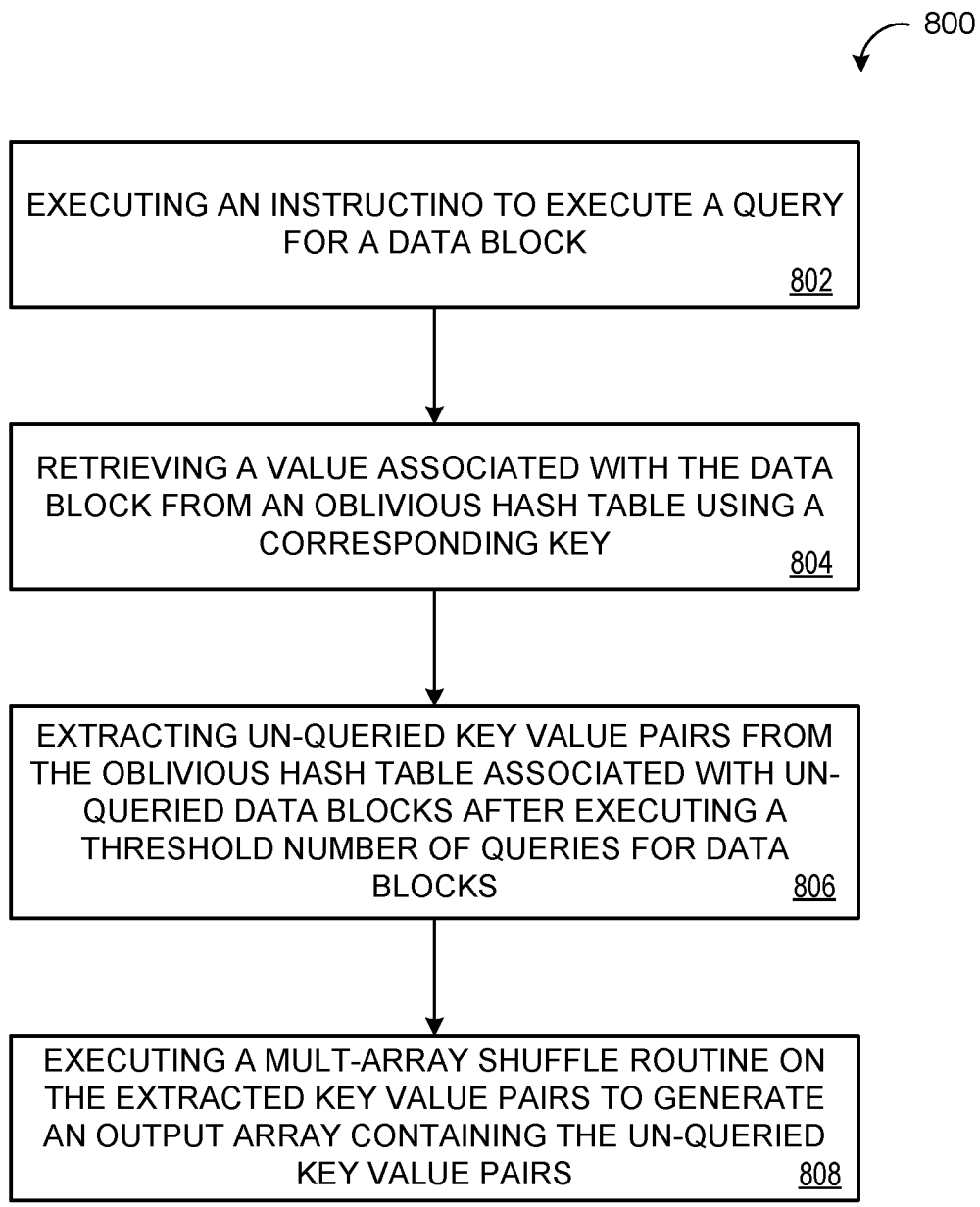
FIG. 8 is a flowchart of an example method for concealing access patterns of data blocks retrieved by a client.

FIG. 8 is a flowchart of an example method 800 executed by the computing device 700 (e.g., data processing hardware 124) of FIG. 7 for concealing access patterns to a storage abstraction 200 on a distributed system 140. At operation 802, the method 800 includes executing an instruction 450 to execute a query (q) for a data block (B). The data block (B) is associated with a corresponding memory level ($l_i$) of a logarithmic number of memory levels ($l_i$) of memory. Each memory level ($l_i$) includes physical memory ($RAM_i$) residing on memory hardware 114 (e.g., storage abstraction 200) of the distributed system 140 in communication with the data processing hardware 124. At operation 804, the method 800 includes retrieving a value (v) associated with the data block (B) from an oblivious hash table 600 using a corresponding key (k). At operation 806, the method 800 includes extracting un-queried key value pairs (k, v) from the oblivious hash table 600 associated with un-queried data blocks (B) after executing a threshold number of queries (q) for data blocks (B). The method 800 also includes, at operation 808, executing a multi-array shuffle routine 500 on the extracted key value pairs (k, v) from the oblivious hash table 600 to generate an output array containing the un-queried key value pairs (k, v).

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware of a client device causes the data processing hardware to perform operations comprising:
executing an instruction to execute a query (q) for a data block (B) residing on memory hardware of a distributed system in communication with the data processing hardware or on memory hardware of the client device;
determining whether the data block (B) is stored locally on the memory hardware of the client device; and
when the data block (B) is stored locally on the memory hardware of the client device:
retrieving the data block (B) from the memory hardware of the client device; and
issuing one or more fake queries to the distributed system for retrieving a corresponding dummy block (D) to conceal the retrieval of the data block (B) from the memory hardware of the client device.

2. The method of claim 1, wherein the operations further comprise, after issuing the one or more fake queries to the distributed system:
receiving the corresponding dummy block (D) from the distributed system; and
discarding the corresponding dummy block (D).

3. The method of claim 1, wherein the operations further comprise, when the data block (B) is stored on the memory hardware of the distributed system:
retrieving a value (v) associated with the data block (B) from an oblivious hash table using a corresponding key (k);
extracting un-queried key value pairs (k, v) from the oblivious hash table associated with un-queried data blocks after executing a threshold number of queries (q) for data blocks; and
generating an output array that contains the un-queried key value pairs (k, v).

4. The method of claim 3, wherein generating the output array comprises executing a multi-array shuffle routine on the extracted un-queried key value pairs (k, v) from the oblivious hash table.

5. The method of claim 4, wherein executing the multi-array shuffle routine comprises:
merging one or more input arrays of data blocks (B) each having a capacity less than a threshold capacity into a new array; and
shuffling the new array obliviously.

6. The method of claim 3, wherein the data block (B) is associated with a corresponding memory level ($l_i$) of a logarithmic number of memory levels ($l_i$) of memory, each memory level ($l_i$) comprising physical memory ($RAM_i$) residing on a storage abstraction of the distributed system.

7. The method of claim 6, wherein the logarithmic number of memory levels ($l_i$) comprise a logarithmic number of memory levels ($l_i$) of increasing size where each memory level ($l_i$) has a storage capacity equal to the joint capacity of all preceding smaller memory levels ($l_i$).

8. The method of claim 7, wherein the operations further comprise, when the corresponding memory level ($l_i$) associated with the data block (B) is not a lowest memory level ($l_j$), moving the data block (B) to the lowest memory level ($l_j$) after executing the instruction to execute the query (q).

9. The method of claim 1, wherein the instruction to execute the query (q) for the data block (B) comprises an operation including a read or write operation on the data block and an address indicating a memory location for the data block (B).

10. The method of claim 9, wherein the instruction to execute the query (q) for the data block (B) further comprises data when the operation includes the write operation.

11. A system comprising:
data processing hardware of a client device; and
memory hardware in communication with the data processing hardware and storing instructions, that when executed by the data processing hardware, cause the data processing hardware to perform operations comprising:
executing an instruction to execute a query (q) for a data block (B) residing on memory hardware of a distributed system in communication with the data processing hardware or on the memory hardware of the client device;

determining whether the data block (B) is stored locally on the memory hardware of the client device; and when the data block (B) is stored locally on the memory hardware of the client device:
- retrieving the data block (B) from the memory hardware of the client device; and
- issuing one or more fake queries to the distributed system for retrieving a corresponding dummy block (D) to conceal the retrieval of the data block (B) from the memory hardware of the client device.

12. The system of claim 11, wherein the operations further comprise, after issuing the one or more fake queries to the distributed system:
- receiving the dummy block (D) from the distributed system; and
- discarding the received dummy block (D).

13. The system of claim 11, wherein the operations further comprise, when the data block (B) is stored on the memory hardware of the distributed system:
- retrieving a value (v) associated with the data block (B) from an oblivious hash table using a corresponding key (k);
- extracting un-queried key value pairs (k, v) from the oblivious hash table associated with un-queried data blocks after executing a threshold number of queries (q) for data blocks; and
- generating an output array that contains the un-queried key value pairs (k, v).

14. The system of claim 13, wherein generating the output array comprises executing a multi-array shuffle routine on the extracted un-queried key value pairs (k, v) from the oblivious hash table.

15. The system of claim 14, wherein executing the multi-array shuffle routine comprises:
- merging one or more input arrays of data blocks (B) each having a capacity less than a threshold capacity into a new array; and
- shuffling the new array obliviously.

16. The system of claim 13, wherein the data block (B) is associated with a corresponding memory level ($l_i$) of a logarithmic number of memory levels ($l_i$) of memory, each memory level ($l_i$) comprising physical memory ($RAM_i$) residing on a storage abstraction of the distributed system.

17. The system of claim 16, wherein the logarithmic number of memory levels ($l_i$) comprise a logarithmic number of memory levels ($l_i$) of increasing size where each memory level ($l_i$) has a storage capacity equal to the joint capacity of all preceding smaller memory levels ($l_i$).

18. The system of claim 17, wherein the operations further comprise, when the corresponding memory level ($l_i$) associated with the data block (B) is not a lowest memory level ($l_j$), moving the data block (B) to the lowest memory level ($l_j$) after executing the instruction to execute the query (q).

19. The system of claim 11, wherein the instruction to execute the query (q) for the data block (B) comprises an operation including a read or write operation on the data block and an address indicating a memory location for the data block (B).

20. The system of claim 19, wherein the instruction to execute the query (q) for the data block (B) further comprises data when the operation includes the write operation.

* * * * *